United States Patent
Sutter et al.

(10) Patent No.: US 11,802,007 B2
(45) Date of Patent: Oct. 31, 2023

(54) PROFILE SINGULATOR

(71) Applicant: Stefan Pfaff Werkzeug—und Formenbau GmbH & Co KG, Roethenbach (DE)

(72) Inventors: Anton Sutter, Weiler-Simmerberg (DE); Alexander Reiners, Niederkruechten (DE)

(73) Assignee: Stefan Pfaff Werkzeug—und Formenbau GmbH & Co KG, Roethenbach (DE)

( * ) Notice: Subject to any disclaimer, the term of this patent is extended or adjusted under 35 U.S.C. 154(b) by 49 days.

(21) Appl. No.: 17/455,481

(22) Filed: Nov. 18, 2021

(65) Prior Publication Data

US 2022/0169453 A1    Jun. 2, 2022

(30) Foreign Application Priority Data

Nov. 27, 2020 (EP) .................................. 20210452

(51) Int. Cl.
   *B65G 47/31* (2006.01)
(52) U.S. Cl.
   CPC .................................. *B65G 47/31* (2013.01)
(58) Field of Classification Search
   CPC .......................... B65G 47/1471; B65G 47/31
   See application file for complete search history.

(56) References Cited

U.S. PATENT DOCUMENTS

| | | | | |
|---|---|---|---|---|
| 3,586,078 A | * | 6/1971 | Hamilton | A01G 23/097 |
| | | | | 414/547 |
| 6,267,224 B1 | * | 7/2001 | Jones | B65G 47/1471 |
| | | | | 198/443 |
| 6,401,906 B1 | * | 6/2002 | Franz | B65G 19/02 |
| | | | | 198/397.06 |

FOREIGN PATENT DOCUMENTS

| | | | | |
|---|---|---|---|---|
| CN | 109264439 A | | 1/2019 | |
| DE | 508470 C | | 10/1930 | |
| DE | 1022754 | | 1/1958 | |
| DE | 1022754 B | * | 1/1958 | ......... B65G 47/1492 |
| ES | 2900809 T3 | * | 3/2022 | ......... B65G 47/1492 |
| GB | 319227 A | * | 9/1929 | ............... A21B 5/02 |

OTHER PUBLICATIONS

Search Report for European Patent Application No. 20210452.7 dated Jun. 4, 2021, 8 pages.

* cited by examiner

*Primary Examiner* — Gene O Crawford
*Assistant Examiner* — Lester Rushin, III
(74) *Attorney, Agent, or Firm* — Christopher J. Volkmann; Kelly, Holt & Christenson, PLLC

(57) ABSTRACT

Additional automation in the form of a profile singulator for singulating profiles is proposed which includes: a first conveying device for feeding the profiles in a disorderly state over a first conveying section, a conveyor roller for unraveling the large quantity of fed profiles into individual profiles, wherein the conveyor roller is situated downstream from the first conveying device in the direction of transport. The profiles can be limp, flexible, or semi-flexible; moreover, they can have or not have a carrier.

14 Claims, 3 Drawing Sheets

PROFILE SINGULATOR

CROSS-REFERENCES TO RELATED APPLICATION

This application claims the benefit of European Application No. 20210452.7, filed Nov. 27, 2020, the entirety of which is incorporated herein by reference, further the entirety of the attached translation of European Application No. 20210452.7 is incorporated by reference.

SUMMARY

A profile singulator for singulating profiles includes a first conveying device for feeding the profiles in a disorderly state over a first conveying section. The profile singulator includes a conveyor roller for unraveling a large quantity of fed profiles into individual profiles. The conveyor roller is situated downstream from the first conveying device in a direction of transport.

DETAIL DESCRIPTION

Figure 1:
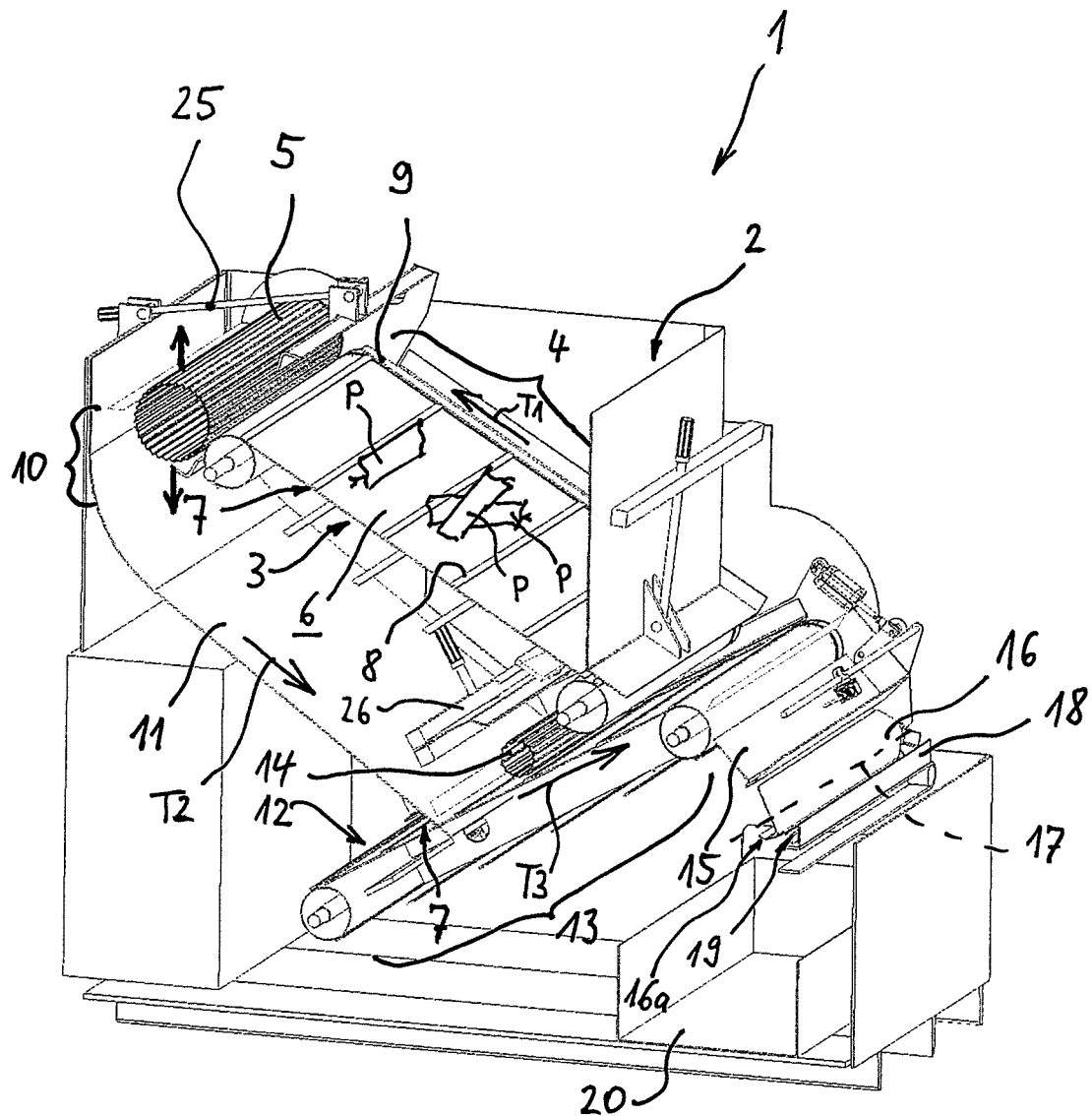
FIG. 1 shows a schematic view of an example profile singulator.

An embodiment disclosed below relates to a profile singulator for singulating profiles, in particular limp, flexible, or semi-flexible profiles, in each case with or without a carrier.

Insofar as it is known from the prior art, the conventional manufacturing logistics and handling of profiles, especially limp profiles which, as injection-molded parts, are typically used, for example, for door and window seals of motor vehicles, are largely based on manually singulating and positioning the limp profiles. After the first production step, extrusion, the profile blanks obtained in this way are usually collected in a box and taken in the box to the next processing station. There the profiles are removed individually from the box by an operator and, for example, positioned in a form such that the next processing step can then be performed by machine (for example, a procedure of injection-molding onto the profile, a procedure in which the profile is trimmed, or the like). The profiles may lie in the box in different ways depending on the situation. It is generally unlikely that the profiles are situated in the box in an orderly fashion using this common practice from the prior art and instead they can even be tangled up with one another. The operator therefore has had up until now, depending on what state the profiles in the box are in, to unravel the profiles in order to be able to remove them individually, to provide them for the next processing station, and for example to lay them, positioned precisely, in a form.

One benefit of an embodiment herein described is to be able to reduce the costs when manufacturing profiles of this type.

In order to enable a corresponding reduction in the manufacturing costs, an embodiment increases the degree of automation for the manufacturing. In this way, in an embodiment, not only can a saving be made in terms of staff but the space required for the manufacturing can also be reduced because less room generally needs to be provided for the proposed profile singulator than for a workstation. Instead, the profile can be handled by a robot.

In order to achieve this, in an embodiment a profile singulator for singulating the profiles is made available. An embodiment hence overcomes the technical misconception that automated handling is unreliable or not possible at all owing to the limp mechanical properties of such profiles and owing to the fact that they can be entangled with one another in a disorderly fashion. However, an embodiment can also in principle be used for handling profiles which have a greater stiffness than limp profiles. For example, the profile singulator according to an embodiment can also be used for flexible or semi-flexible profiles. Sometimes so-called carriers are also situated into the profiles which are intended to make handling easier by increasing the stiffness of the profile. The profile singulator according to an embodiment can correspondingly also be used for profiles of this type with or without a carrier.

The profile singulator according to an embodiment first comprises a first conveying device for feeding the profiles which can be removed from a store of profiles which are generally present in a disorderly state. The first conveying device transports the profiles over a first transport section. To perform the singulating, a conveyor roller (also referred to as a take-up roller) is situated downstream from the first conveying device, i.e. the first conveying device feeds the profiles to the conveyor roller. The conveyor roller modifies the transporting movement of the profiles, which can cause the large quantity of fed profiles to be unraveled into individual profiles.

In an embodiment, the conveyor roller can have, for example, a different surface from the first conveying device and hence possess different friction properties or different adhesive friction than the first conveying device. A different surface can be formed in various ways:

On the one hand, different materials can be chosen for the surfaces.

On the other hand, the surface structure or the surface profile can be chosen differently.

It is also conceivable that an independent device such as a scraper conveyor is chosen in one of the cases.

As soon as the profiles pass over the conveying device to the conveyor roller, individual profiles are, depending on their situation, drawn away by virtue of the different friction conditions and extracted from the large quantity of profiles. In an embodiment, the conveyor roller can preferably have at its surface a path speed which differs from the conveying speed of the first conveying device. In particular when the conveying speed of the first conveying device is slower than the path speed at the surface of the conveyor roller, the conveyor roller can extract a single profile, even from a large quantity of profiles, as soon as there is sufficiently great adhesion of the profile to the roller. Separating the profile from a large quantity of profiles is favored by the higher path speed of the conveyor roller, and the profile can be extracted more easily from the remaining large quantity because of its inertia.

In this respect, it can also be advantageous if the conveyor roller has friction which differs from the first conveying device because the moment at which the adhesive friction at the conveyor roller is sufficient to be able to extract a profile is often not reached when the profile has just come into contact with the conveyor roller via the first conveying device and instead only when the roller has a sufficient contact surface area with the profile.

In a development of an embodiment, the conveyor roller can, for example, have a surface which is provided with teeth. There can, for example, be a barrier-like protrusion in the surface which runs along the axis of rotation of the conveyor roller. In principle, the teeth make it easier for a profile to be carried along by the conveyor roller because the surface to which a profile can adhere is thereby increased or typically ribs of the profile can become hooked therein.

Furthermore, the conveyor roller can also have a smooth surface, and to be precise in principle also when the conveyor roller is provided with teeth. This means that, even in the design with teeth, edges are avoided and a smooth transition even over the toothed structure is provided. If the adhesive friction of the surface of the conveyor roller relative to the profiles is chosen to be too high, many profiles could be carried along at once as soon as the profiles come into contact with the conveyor roller at the end of the first conveying section; such an effect would counteract the singulation. Exemplary embodiments with a smooth surface of the conveyor roller but without teeth are generally conceivable, but exemplary embodiments with teeth and without a smooth surface are in principle also conceivable. This choice also depends largely on the nature of the profiles (shape and size of the profiles and the plastic surface properties of the profiles which can also be coated).

In principle, the singulation of the profiles by the conveyor roller is more difficult if relatively large quantities of profiles move at once toward the roller, in particular if the profiles at least partially lie over one another, are piled up or hook into one another. This can lead to a situation in which a profile lying on the floor of the conveying section is carried along together with further profiles lying above it, because they are supported on the lower profile. Therefore, in an embodiment, it can be helpful if the first conveying section is tilted or is designed to be tiltable at adjustable angles. Particularly when the first conveying section rises in the transport direction, individual profiles can, during transport, drop down for example from a stack of a plurality of profiles, or it is overall more difficult or more improbable that from the quantity a plurality of profiles stacked above one another pass to the conveyor roller. This is because the profiles are transported toward the roller and possibly are also accelerated toward the conveyor roller. However, a subcomponent of the gravitational force thus acts in a direction away from the conveyor roller. It is also possible as a result of inertia that, during acceleration of the profile lying on the bottom, stacked profiles are moved away from the conveyor roller by the first conveying device. It is possible in this way for more reliable singulation to occur.

The singulation process can be subdivided over the transport route over which the profiles travel. The first conveying device can hereby undertake some of the singulation. The fewer profiles which in principle pass to the conveyor roller at the same moment, the greater the probability that the profiles are effectively singulated.

In a particular embodiment, the first conveying device can be designed as a scraper conveyor. A scraper conveyor consists first of a floor of the conveying section, on which the profiles lie. At least one movable, ladder-like structure which consists of an arrangement of carrier bars is situated on the floor. These carrier bars can in each case be guided at the edges by a chain. The chain is mounted in each case at the edge by engaging in sprocket wheels and is driven by the rotation of the latter. Alternatively, the driving can, however, also be effected by, for example, a toothed belt (instead of a chain) which is driven by a toothed belt wheel. When the sprocket wheels rotate, the chain is driven and the carrier bars are moved over the floor such that loose bulk materials, in this case the corresponding profiles, can be carried along by the respective carrier bars and transported over the conveying section. The composition of the surface of the floor and the carrier bars can be adjusted to the plastic profiles such that it is ensured that they can be carried along simply. For example, the floor or the carrier bars can each be manufactured from stainless steel or brass.

In order to prevent possible friction effects, different materials can be used for the carrier bars and the floor. In principle, the spacing at which the carrier bars are moved over the floor can also be modified. The grater the spacing of the carrier bars from the floor, the higher the contact point at which force is exerted on the profiles. The contact point can therefore be brought to the level of the center of gravity of the profiles such that it is more likely that the profiles move in translation than in rotation. On the other hand, the spacing between the floor and the carrier blade should in turn not be so great that the profiles can become trapped in the gaps and then get scratched or obstruct the transporting.

It is also conceivable that the first conveying device is designed as a conveyor belt. A scraper conveyor can in principle make it easier for individual profiles to be carried along because the contact with the carrier bars itself causes the transporting force and the whole floor is not moved, as is the case with a conveyor belt. However, it can depend specifically on the choice of profiles and their properties and material. As a rule, pre-singulation can advantageously take place by means of a scraper conveyor.

In an embodiment, a drop section can be situated downstream from the conveyor roller. As a result, the singulation can in particular be favored because individual profiles move away from the following profiles very quickly by means of the drop section. Instead or in addition, a chute can also be provided. As opposed to a drop section, the chute can in turn exert a braking effect on the profiles which have been accelerated beforehand when they drop down. A chute can also in principle be designed such that the singulated or pre-singulated profiles are first accelerated significantly in order to obtain a greater distance from the following profiles. The chute can also in principle have two regions with a different friction effect on the profiles moving over them such that the profiles are, for example, first accelerated and then slowed down as they drop down. Such an effect can possibly also be achieved by a variable slope of the chute.

In order to design the profile singulator as compactly as possible, the direction of transport can in particular be reversed downstream from the conveyor roller.

In order moreover to prevent profiles from piling up, a second conveying device can be situated downstream from the chute and move the profiles over a second conveying section. This conveying device or conveying section can also in principle be designed so that it is tilted or with an adjustable angle. The path can in turn rise in the direction of transport such that as a result of this too the singulation can again be favored. In particular, this enables only those profiles to be transported onward which have sufficient contact with the second conveying device, whereas profiles which have just arrived do not yet move onto the conveying device so that there is no undesired pile-up which again counteracts the singulation which has already taken place. In principle, in the case of a tilted second conveying section, the same advantages as for the first conveying section can be realized and therefore the singulation is assisted.

It can generally happen that, for example, two or more profiles already lie on top of each other in the region of the conveyor roller and hence move downward together via the drop section and the chute. In order to increase the degree of singulation and, for example, further separate profiles lying on top of each other, a barrier device can be provided. The latter can be arranged, for example, in the region of the second conveying section, possibly also in the transition area from the chute to the second conveying section. It may be appropriate to design a barrier device of this type as a mechanical obstruction, in particular in the form of a through opening. A clear through opening in the form of a gate can, however, have the disadvantage that individual profiles become entangled and get stuck therein and the transporting is thus impeded. Instead, a moving barrier device can advantageously be provided which makes it more unlikely that the profiles become entangled and there is a blockage in the transporting.

In an embodiment, a pinch roll or braking roll can, for example, be provided which is either mounted rotatably such that it can co-rotate in contact with the profiles but is mounted at a fixed point or alternatively is rotated such that a force, in particular a shearing force, acts on the profiles between the roll and the conveyor belt or scraper conveyor situated below them.

A barrier device can also advantageously also be arranged earlier in the region of the first conveying device or over the first conveying section. It is fundamentally highly likely that a plurality of profiles which are joined together or lie on top of each other are transported together at one time. However, these arrangements of profiles in clusters can be pulled apart by means of a barrier device in the form of a height limit.

Such a barrier device can generally be designed such that it comprises a wheel which rotates so that the section facing the conveyor line displays a speed vector in the opposite direction to the conveying device. This results in shearing forces which act on any clusters of profiles such that the profiles situated in the bottom region tend to be transported onward in the conveying direction, whereas the profiles situated in the upper region are sheared off in the opposite direction. The singulation can be assisted in this manner.

The profiles may be joined together in a very complex fashion. In principle, the situation must therefore be taken into consideration in which the profiles are still joined together and could not be singulated after they have passed the second conveyor line. In this situation, in an embodiment, a deflector is situated downstream from the conveying device in order to allow the singulated profiles to pass through but not conglomerations of joined-together profiles, depending on whether the conveyed profiles are conveyed in singulated form or are delivered in singulated form via the second conveying section. Furthermore, special situations can, however, also be handled; for example, the orientation of the profiles can be modified.

Detecting in this way whether profiles have or have not been singulated can be effected by an optical sensor device, a camera, or the like. An evaluation device with artificial intelligence can here also be used which is, for example, capable of learning optical features by means of which it is easier to detect whether profiles are joined together or are stacked on top of each other, or the way in which a profile is oriented on the conveying section. In addition, it is also possible to determine by means of such a sensor device how many profiles per unit time pass through a region of the conveying section. In order, for example, to increase the degree of singulation by means of a conveyor roller, it is necessary that not too many profiles arrive at the conveyor roller at one time. The speed of a conveying device can therefore also be controlled by the sensor device. So that too many profiles do not arrive at the conveyor roller at one time, the upstream conveying device can, for example, slow down their transport.

In an embodiment, this deflector can be designed with an L-shaped profile in cross-section, in particular with a sheet-metal L-shaped profile, for example from stainless steel. By virtue of the L-shape, this profile has a smooth back or sliding surface over which the profile can slide along under gravity. A collecting bracket or trough for collecting profiles is then provided on the opposite side, angled toward one side of the L-profile. In this situation, the deflector is positioned by the L being mounted about an axis perpendicular to the plane in which the L-shape is present and then being rotated depending on the results from the sensor device, and the profiles, singulated as intended, can slide over the smooth side to a first collecting region in which the singulated profiles can, for example, be grasped by a gripper and brought to a processing station.

If the profiles have been singulated but are still lying in the wrong orientation, rotation by means of the deflector is possible by the latter being rotated, for example, by 90° relative to the position in which the smooth sliding surface is available. The profile can then hit the deflector and be collected by the collecting trough. By continuing to rotate the deflector, the profile can be turned over such that it has not only been singulated but also lies in the correct position in order then to be collected by a gripper or robot and further processed.

If a plurality of profiles are still entangled with one another and further processing is not possible, the deflector can be rotated such that the profile hits the smooth sliding surface and takes a different route into a second collecting region for the purpose of separation. For example, the profiles from the second collecting region are put into the profile singulator again or are singulated in a different manner and further processed.

Furthermore, a sensor device can advantageously be used to establish, at any points over the whole extent of the path, i.e. over the first and second conveying device and between them over the region of the conveyor roller, the drop section, and the chute, whether individual profiles are entangled with one another or whether, for example, too many profiles are being conveyed at one time. Adaptations of the conveying speeds, the speed of rotation of the conveyor roller, inclinations of conveying sections or may be adapted if appropriate.

The first collecting region can likewise have an L-shaped profile in order to collect the singulated profiles. These profiles are not only singulated but also positioned such that they can be seized by a robot in a defined fashion. A gripping arm can, for example, be swiveled in from above, whilst a clamping lever is folded down from the opposite side such that the singulated profile is retained between them. The gripper can be designed such that, for example, it engages in the intermediate regions of the ribs and extracts the profile by being withdrawn from or pivoted out of the collecting region. In this way, the profile also has the correct orientation so that it can be positioned accurately in the next processing station.

FIG. 1 shows a profile singulator 1 in an embodiment, in which an open housing side wall and a section through the singulator 1 are shown schematically. The starting material of profiles P is stored in the region 2 and transported to a conveyor roller 5 by the first conveying device 3 over the first conveying section 4. The first conveying device 3 comprises a floor 6. The profiles P are moved over the first conveying section 4 by means of a scraper conveyor 7.

Carrier bars 8 of the scraper conveyor 7 are additionally provided for this purpose which are each fastened at the side to a chain 9 and can be moved over the floor 6 in an orientation perpendicular to the conveying direction. The chain 9 is typically pulled by a sprocket wheel drive. As can be seen in FIG. 1, the first conveying section 4 is arranged so that it is tilted, and to be precise so that it rises toward the conveyor roller 5 or in the direction of transport T1. In this way, the profiles P must be moved at least partially counter to gravity. It is hereby less likely that clusters of profiles are moved upward because, when accelerated by means of the scraper conveyor 7, initially especially the profiles P lying at the bottom are subject to a force, whereas the upper profiles P lying on top of one another in a cluster tend, because of their inertia, instead to fall back in the direction of gravity toward the storage region 2.

The conveyor roller 5 has a toothed structure with a smooth surface. The roller 5 is generally rotated so quickly that the path speed of a point on the surface is greater than the conveying speed of the first conveying device 3. Individual profiles P can thus be effectively drawn from the conveying section 4 and singulated.

So that the (singulated) profiles P which have been seized and drawn away by the conveyor roller 5 can be conveyed onward as rapidly as possible, a short drop section 10 is situated immediately downstream from the roller 5. The profiles P thus fall onto a chute 11 with a slope which catches and slows the profiles P down somewhat as they drop down. The chute 11 is configured such that the direction of transport T2 of the profiles P is virtually the opposite of the direction of transport T1.

At the end of the chute 11, the profiles P pass onto the second conveying device 12 with the second conveying section 13. A scraper conveyor 7 is provided here too. The second conveying section 13 in turn runs in a rising fashion. A barrier device 14 is provided above the second conveying section 13 at a predetermined distance therefrom in order to be able to break up and separate any clusters or conglomerations of profiles. The barrier device 14 comprises for this purpose a wheel or a pinch and braking roll with a toothed surface which, in the perspective view in FIG. 1 of the open side of the profile singulator 1, rotates clockwise. At the point which faces the transport surface of the second conveying section 13, the speed vector therefore opposes the conveying direction T3 of the second conveying device 12. Stacked profiles P consequently not only encounter a mechanical barrier in the form of a compulsory height limit but also are thereby sheared because the profiles on the floor in the conveying direction T3 and an opposite force acts on the profiles lying higher above the conveying section 13. The singulating process can consequently be improved.

At the end of the second conveying section 13, the profiles drop down over a short chute 15 onto a deflector 16 which has an L-profile (an "L" or a "mirror-image L"). The deflector 16 can be rotated about the axis of rotation 17. The deflector 16 is positioned in FIG. 1 such that the smooth back of the L-profile serves as a chute for the profiles, following the chute 15.

Following the deflector 16, a wide L-shaped profile in turn is situated as a first collecting region 18 into which the singulated profile P slides. A clamping lever 19, which can be pivoted from below against the singulated profile P, is arranged in the L-profile of the first collecting region 18. In addition, a gripping lever (not shown) can be pivoted from above into the first collecting region 18. The profile P is clamped between them and removed from the first collecting region 18.

The deflector 16 can be pivoted about the axis of rotation 17 but also (when viewing the front, open side of the singulator 1) by 90° counterclockwise relative to the view in FIG. 1 so that a profile P from the chute 15 hits the deflector 16 and from there falls into the second collecting region 20. This segregation is employed in order, for example, to separate conglomerations of profiles which could not be unraveled and singulated.

The L-shape of the deflector 16 has the advantage that a profile can first also be collected with the aid of the collecting trough 16a. For this purpose, the deflector 16 must be rotated by 90° clockwise about the axis of rotation 17 (when viewing the front, open side of the singulator 1) relative to the view in FIG. 1. A profile P lying wrongly can thus be rotated again. It hits the deflector 16 and is collected by the collecting trough 16a. The deflector 16 is then rotated further clockwise by a further 90° so that the collected profile P is also turned over and, correctly oriented, can slide into the first collecting region 18.

The conveyor roller 5 can be adjusted with respect to its position, in particular relative to the first conveying device 3 and/or to the first conveying section 4, i.e. is height-adjustable and/or pivotable. A setting device 25 is provided for this purpose. The singulating process can be optimized by such a measure because, depending on the position of the conveyor roller 5 relative to the conveying section 4, different forces can act on the profiles which come into contact with the conveyor roller 5. Inter alia, adaptation to different profiles can thus be performed.

Furthermore, the position, in particular the height of the pinch and braking roll 14 (barrier device) with respect to the second conveying section 13 and/or the second conveying device 12 can also be varied by a setting device 26. As a result, it is also possible to perform an adaptation to different profiles, in particular to profiles with a different thickness.

Figure 2:
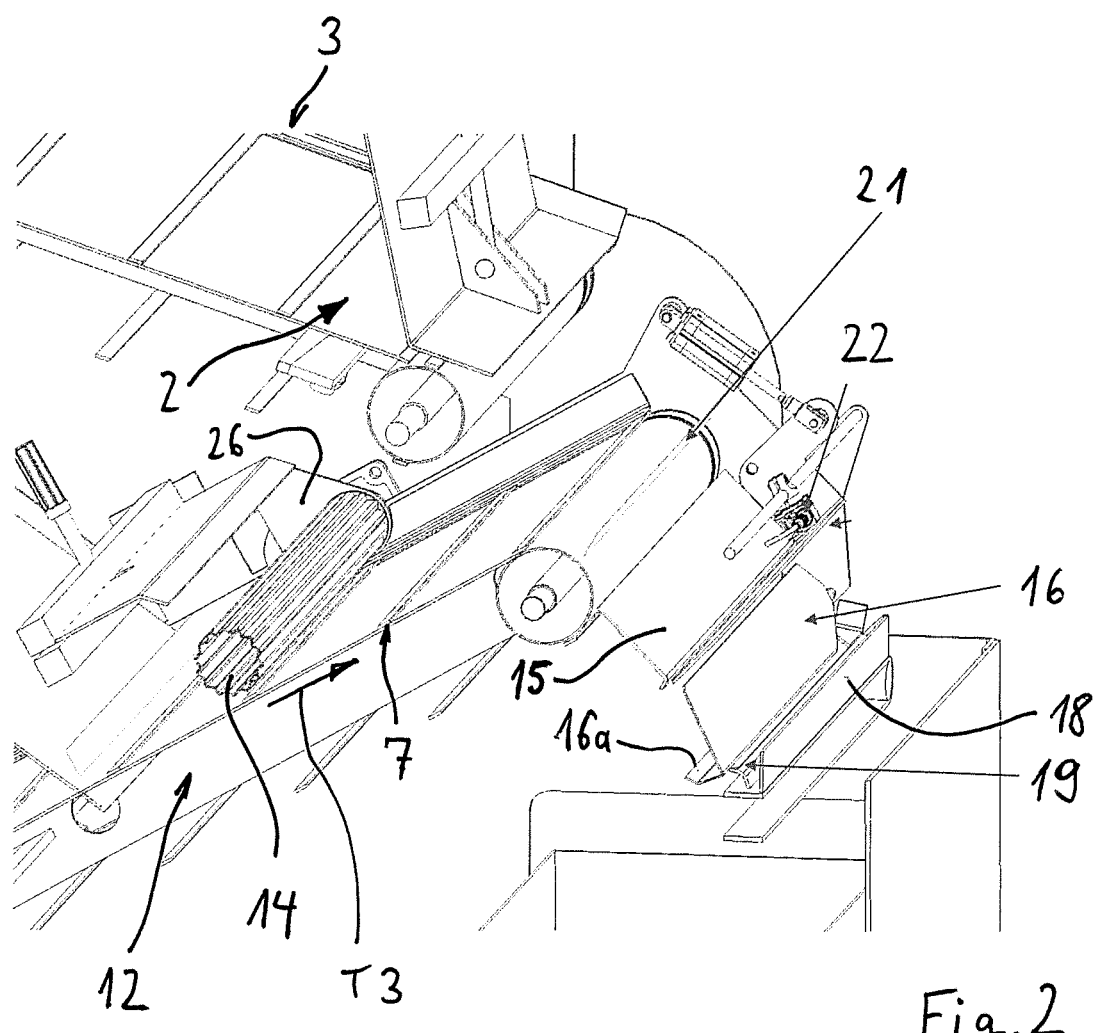
FIG. 2 shows the end region of the example singulator from FIG. 1 in an enlarged view.

An enlarged detail of the end region from FIG. 1 is illustrated in FIG. 2. In particular, two sensors 21, 22 can also be seen here at the end of the second conveying device 12 and in the region of the chute 15, by means of which the deflector 16 is controlled. Depending on whether the approaching profiles P are singulated or not and, if so, how they are oriented, one of the three positions of the deflector 16 is set, i.e. the deflector 16 is rotated accordingly about the axis of rotation 17.

The sensors 21, 22 can have different designs. They can be light barriers but cameras or 2D scanners or the like can also be used in order to ascertain in greater detail the form of any conglomerations of joined-together profiles or the orientation of a profile lying on the conveying section so as to perform a contour recognition or the like.

Figure 3:
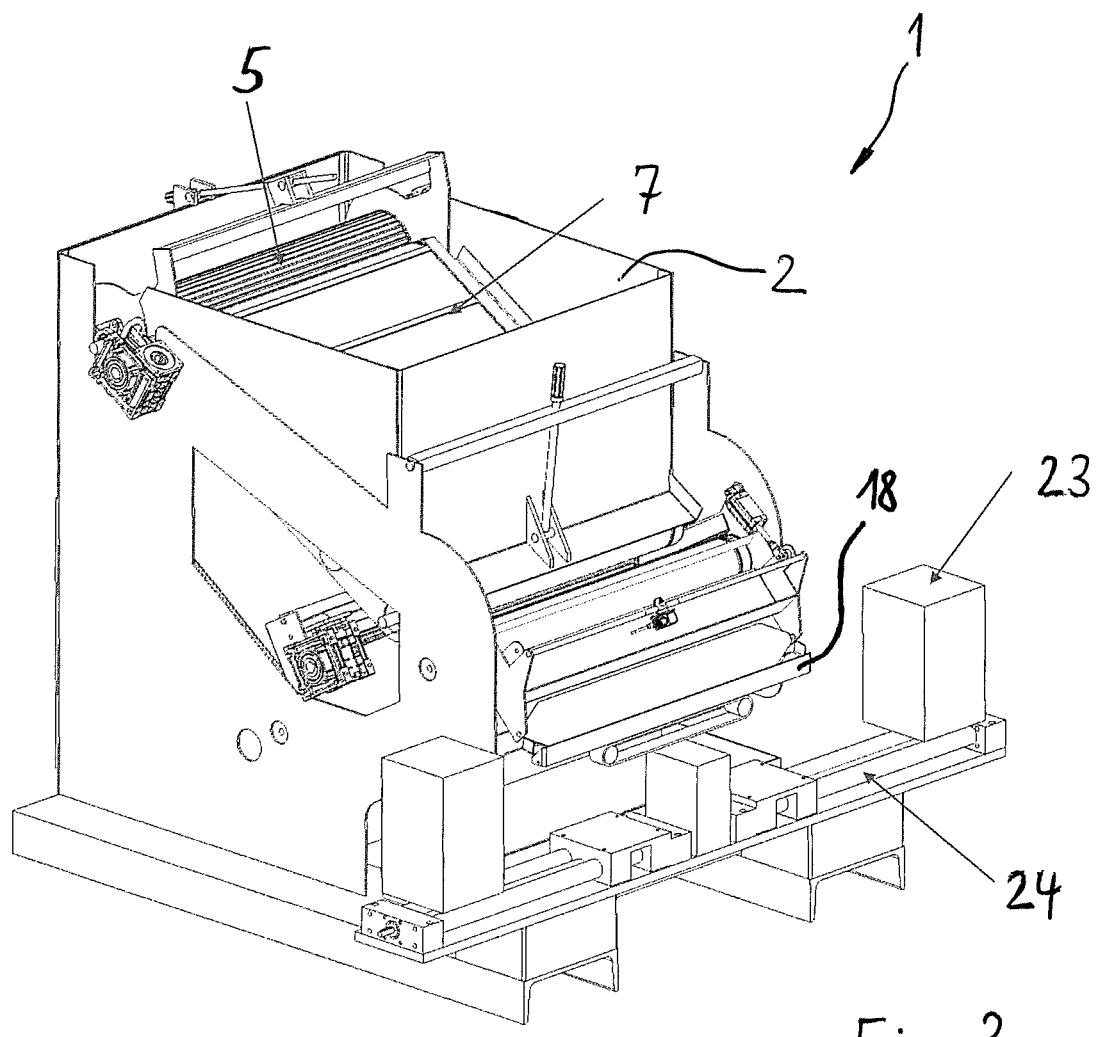
FIG. 3 shows a further view of the example profile singulator with a closed housing and with an additional cutting tool.

The closed profile singulator 1, with a housing, is shown in turn in FIG. 3. A cutting tool 23, which can be displaced via a linear table 24 and by means of which further processing in the form of a trimming operation can be carried out, is arranged at the end of its singulating route.

LIST OF REFERENCE SYMBOLS 1 profile singulator
2 storage region
3 first conveying device
4 first conveying section
5 conveyor roller
6 floor of the first conveying section
7 scraper conveyor
8 carrier bars
9 chain 10 drop section
11 chute
12 second conveying device
13 second conveying section
14 barrier device
15 chute
16 deflector
16a collecting trough
17 axis of rotation of the deflector
18 first collecting region
19 second collecting region
21 sensor
21 sensor
22 cutting tool
23 linear table
24 position-setting device for the conveyor roller
25 position-setting device for the barrier device
P profile
T1 direction of transport
T2 direction of transport
T3 direction of transport

The invention claimed is:

1. A profile singulator for singulating profiles, the profile singulator comprising:
 a first conveying device for feeding the profiles in a disorderly state over a first conveying section at a conveying speed,
 a conveyor roller for unraveling a large quantity of fed profiles into individual profiles,
 wherein the conveyor roller is situated downstream from the first conveying device in a direction of transport,
 wherein the conveyor roller is configured rotate in a direction of roller rotation such that a path speed at a surface of the conveyor roller is greater than the conveying speed of the first conveying device, and
 wherein the conveyor roller has friction and/or adhesion properties that convey the profiles. in the direction of the roller rotation, into a drop section that is downstream of the conveyor roller.

2. The profile singulator of claim 1, wherein the conveyor roller:
 comprises a different surface from the first conveying device, and/or
 can be adjusted with respect to its position relative to the first conveying device and/or to the first conveying section.

3. The profile singulator of claim 1, wherein the conveyor roller comprises:
 a surface provided with teeth; and/or
 a smooth surface.

4. The profile singulator of claim 1, wherein the first conveying section is tilted and/or can be tilted at an adjustable angle, wherein the first conveying section is configured such that the first conveying section rises in the direction of transport.

5. The profile singulator of claim 1, wherein the first conveying device comprises a scraper conveyor and/or a conveyor belt.

6. The profile singulator of claim 1, wherein
 a chute of the conveyor roller is situated downstream from the conveyor roller and/or the drop section, the surface of the chutewhich is designed to exert a braking effect on a movement of the profile which drops down from the conveyor roller, and/or
 the direction of transport is reversed downstream from the conveyor roller.

7. The profile singulator of claim 6, wherein a second conveying device for forwarding the profiles over a second conveying section is situated downstream from the chute and is designed so that the second conveying section is tilted and/or can be tilted at an adjustable angle, wherein the second conveying section is preferably arranged such that the second conveying section rises in the direction of transport.

8. The profile singulator of claim 7, wherein at least one barrier device for further singulating is provided as a mechanical obstruction which is designed as a through opening and/or as a braking roll rotating in the opposite direction to the direction of transport, wherein the at least one barrier device is arranged in each case above the first and/or the second conveying section.

9. The profile singulator of claim 7, wherein a deflector is situated downstream from the second conveying device in order to reject the profiles or allow them to pass through depending on a degree to which the profiles are interlaced.

10. The profile singulator of claim 9, wherein the deflector is designed as an L-shaped sheet-metal profile in cross-section which has on one side a smooth sliding surface over which the profiles can slide along under gravity, and on the opposite side has a collecting trough for collecting profiles.

11. The profile singulator of claim 10, wherein the deflector is mounted rotatably about an axis perpendicular to a plane in which the L-shape is present.

12. The profile singulator of claim 11, wherein a control device for controlling the deflector in rotation is provided which comprises a sensor device for detecting a position and/or an orientation of the profiles and is designed, as appropriate, when individual profiles are transported to the deflector, to rotate the deflector such that the profiles slide over the smooth sliding surface to a first collecting region, and/or when a plurality of profiles are entangled with one another to a high degree, to rotate the deflector such that the profiles hit the smooth sliding surface and slide toward a second collecting region, and/or when profiles do not lie in a predetermined orientation, to rotate the deflector such that the profiles slide into the collecting trough in order to be turned over by the rotation of the deflector.

13. The profile singulator of claim 12, wherein the control device is designed to control the conveying speed of the first and/or second conveying device and/or the angular speed of the conveyor roller, in each case depending on the sensor device.

14. The profile singulator of claim 13, wherein a gripper is provided in order to remove the profiles from the collecting region and/or a processing station is provided in order to process the profiles from the first collecting region.

* * * * *